United States Patent [19]

Mikamo et al.

[11] 4,230,932
[45] Oct. 28, 1980

[54] BLOWERS FOR DRYING VIDEO TAPE RECORDERS

[75] Inventors: Kathumi Mikamo; Shinya Ichimura; Kenichi Yamaguchi, all of Katsuta, Japan

[73] Assignee: Hitachi, Ltd., Japan

[21] Appl. No.: 938,958

[22] Filed: Sep. 1, 1978

[30] Foreign Application Priority Data

Sep. 5, 1977 [JP] Japan .................... 52-118534[U]

[51] Int. Cl.³ ............................................. G11B 15/60
[52] U.S. Cl. ........................... 219/370; 219/201; 219/368; 360/137
[58] Field of Search ............... 219/200, 201, 369, 370; 34/243 R; 360/137

[56] References Cited

U.S. PATENT DOCUMENTS

| 2,114,494 | 4/1938 | Hummel et al. | 219/370 |
| 2,493,067 | 1/1950 | Goldsmith | 219/370 |
| 3,284,611 | 11/1969 | Laing | 34/243 R |
| 3,439,922 | 4/1969 | Howard | 360/137 |
| 3,674,980 | 7/1972 | Cox | 34/243 R |
| 3,860,959 | 1/1975 | Kudou | 360/130 |
| 3,997,919 | 12/1976 | Thompson | 360/137 |
| 4,034,164 | 7/1977 | Westmoland | 360/137 |

Primary Examiner—Roy N. Envall, Jr.
Assistant Examiner—Bernard Roskoski
Attorney, Agent, or Firm—Craig & Antonelli

[57] ABSTRACT

A blower for drying dew produced on the tape running mechanism of a video tape recorder has an air outlet portion having a similar configuration to a tape cassette to be used therewith. The blower is, in use, inserted into a cassette holder of the recorder for loading the tape cassette in position. The blower is further provided with a heater for discharging hot air and a deflector for downwardly directing the hot air discharged.

5 Claims, 5 Drawing Figures

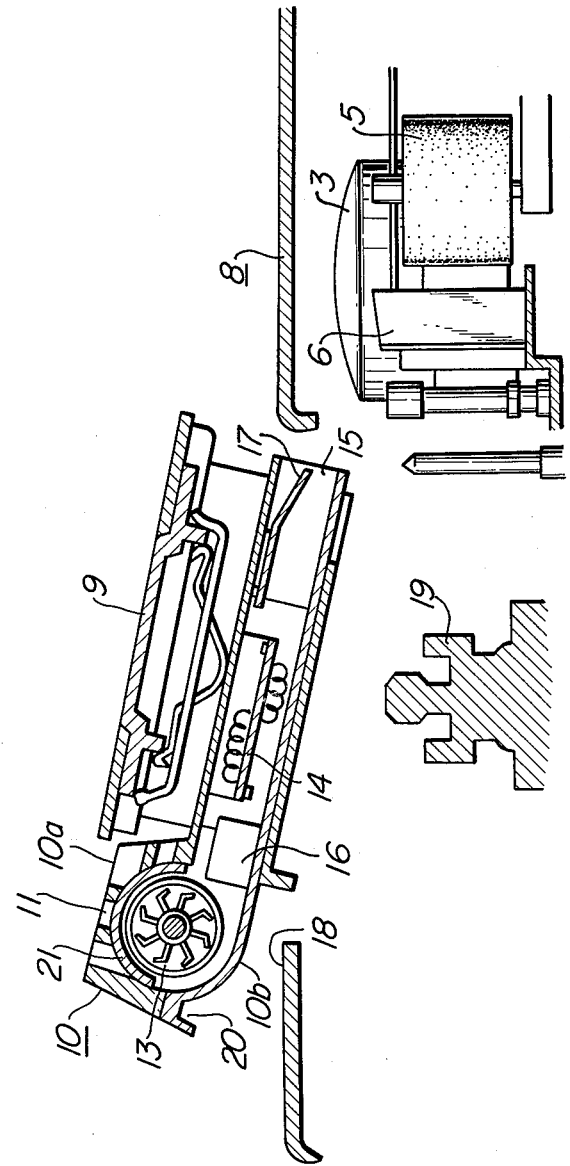

BLOWERS FOR DRYING VIDEO TAPE RECORDERS

BACKGROUND OF THE INVENTION

1. Field of the Invention

This invention relates to a device for rapidly removing dew formed on a metal portion on a tape running path in a video tape recorder.

2. Description of the Prior Art

In a video tape recorder (herein referred to as VTR), dew is produced on a part of the tape running path by moving the device from a low temperature location to a high temperature room in which heating has been made or by rapidly increasing the room temperature by initiating the heating in a cold room, and this will result in inability of the tape running to cause a trouble of cutting or damaging the tape.

FIG. 1 shows an example of a known VTR tape running mechanism in which a video tape cassette is located in its loaded-in position. During the recording or playback mode, a video tape is moved as is shown by a dotted line, while it passes around about a half of a peripheral surface of the tape guide cylinder 3 provided with a rotary magnetic head. At this time, a known erase head 4 and an impedance roller 5 are moved from their retracted positions to positions shown by dotted lines and at which they are brought into engagement with the video tape 2. In a normal temperature condition, the tape will be moved without hindrance. However, if the VTR is moved in winter, for example, from a location of a temperature of 0° C. to another location of a temperature of about 20° C., the temperature of parts of the mechanism in the VTR having a relatively large heat capacity, such as the cylinder 3, the full erase head 4, the impedance roller 5, an audio control head 6 and pinch roller 7, can not be rapidly increased to cause a difference between the temperature of these parts and the ambient temperature thereby producing dew on surfaces of the parts and thus the video tape 2 during running movement tends to be stuck by the dew to the surfaces of the parts, such that the tape 2 is wound around, for example, the cylinder 3 rotating at a high speed to cause the severance of the tape, or stuck to the full erase head 4 to cause the inability of the tape running operation. Therefore, the VTR ought not to be operated under such a condition that dew is produced on its parts. The dew will disappear, if the VTR is left as it is, but a relatively long time, such as several hours, will be required. In order to shorten the time required for the disappearance of the dew, in some kinds of VTR, there is provided a small type of a blower device for directing air to the tape running system for drying it when dew is produced. However, there are drawbacks in that the blower device must be of a fairly small type having a restricted air discharge and a restricted air blowing range, and in that there is no need to mount such blowers in all of the VTR, because the troubles due to the dew are mainly caused in a cold country in winter and almost not caused in summer or in a hot country and thus the provision of the blowers in all of the VTR will increase the cost of the VTR.

In another type of the VTR, a panel above the cylinder is detachably provided in a circular section into which a specific blower is inserted to direct air to the interior of the VTR. However, this arrangement is disadvantageous in that the fixation of the blower is not easy and the VTR does not have a fine external appearance.

SUMMARY OF THE INVENTION

An object of the present invention is to provide a novel drying blower which, if necessary, is easily mounted on VTR to efficiently dry the tape running path within the VTR.

To achieve such an object, a blower according to the present invention is provided with an air outlet portion having a configuration just insertable into an opening of VTR in which a tape cassette is inserted in operation, the air outlet portion being inserted into the opening similar to the tape cassette thereby directing hot air to the interior of the VTR. The VTR using a tape cassette includes a cassette holder for holding the tape cassette to be inserted in use, the cassette holder while holding the tape cassette inserted thereinto being pushed down to engage reels of the cassette with reel tables of the VTR and guide the tape to a position at which it is extracted from the cassette. Under the condition that the cassette holder is ready for receiving the tape cassette, the air outlet portion of the blower having the similar configuration to the cassette is inserted into the cassette inserting opening of the cassette holder. In the blower, there is provided with a heater to blow off hot air from the air outlet port.

With this arrangement, the blower can commonly be used with a number of VTR using the same type of tape cassettes and the attachment and detachment of the blower to and from the VTR are very easy, because use is made by simply inserting the blower into the cassette holder. Furthermore, by using hot air, the time required to evaporate the dew on the tape running mechanism can extremely be reduced in comparison with the natural evaporation of the dew.

BRIEF DESCRIPTION OF THE DRAWINGS

FIG. 5 is a sectional view of the blower of FIG. 2 when mounted on the VTR.

DESCRIPTION OF THE PREFERRED EMBODIMENT

Figure 1:
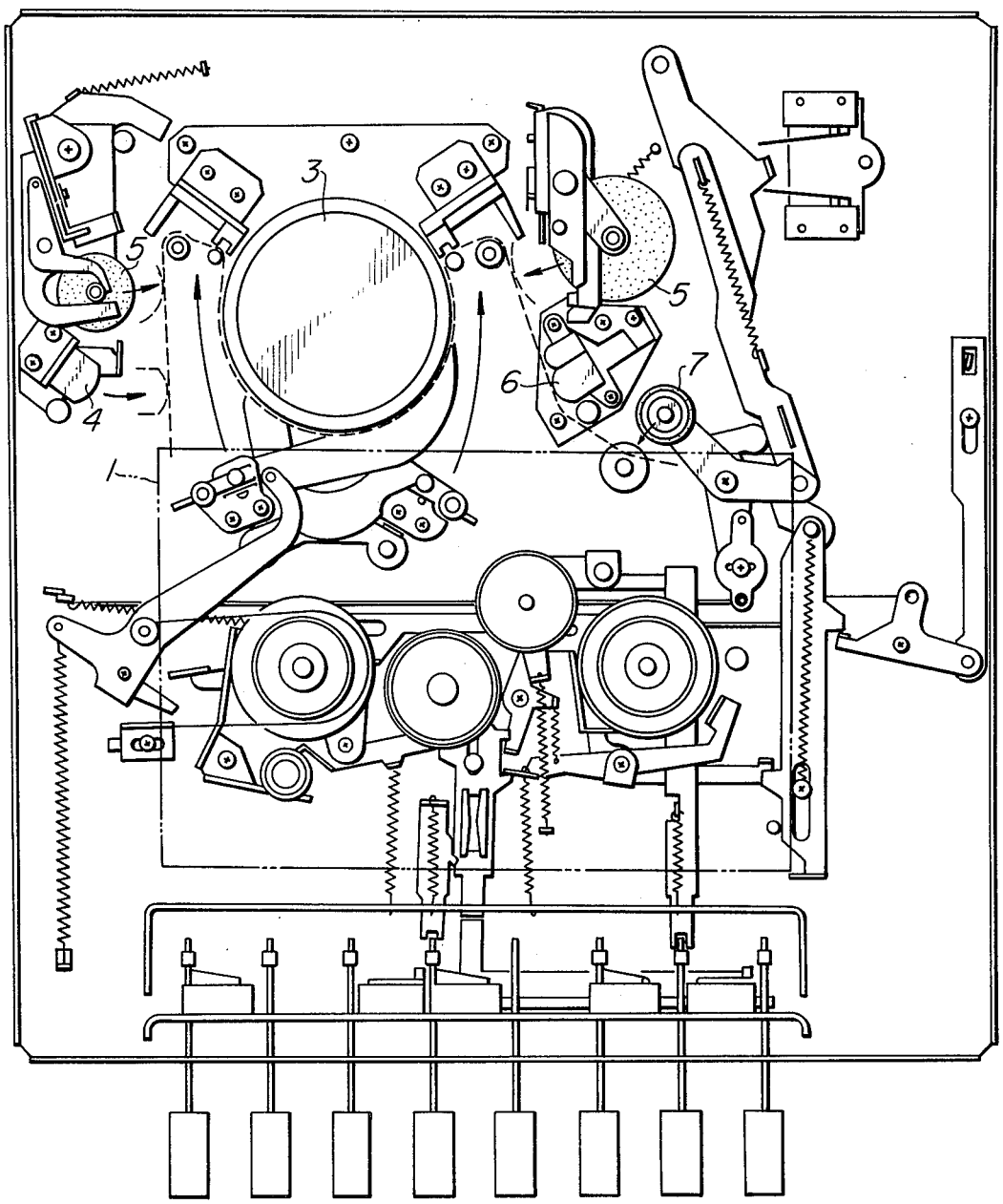
FIG. 1 shows an example of a tape running mechanism of VTR using a tape cassette.
Figure 2:
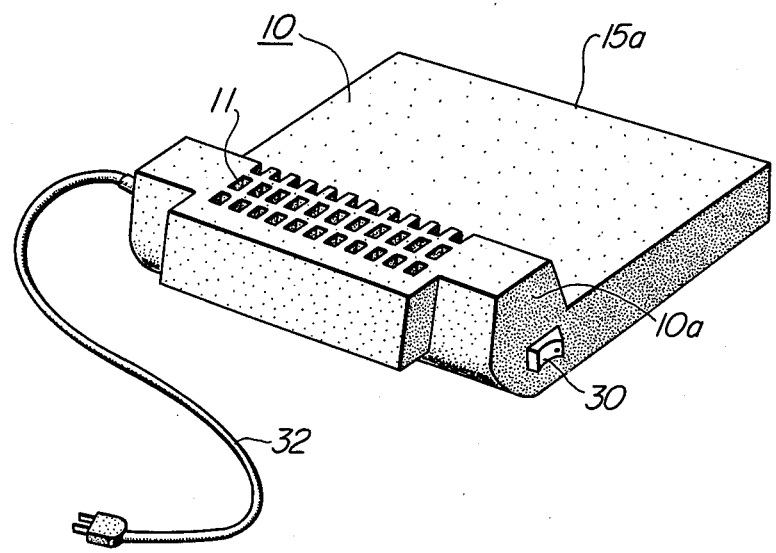
FIG. 2 is a diagrammatic perspective view of a blower for drying a VTR in accordance with the present invention.
Figure 3:
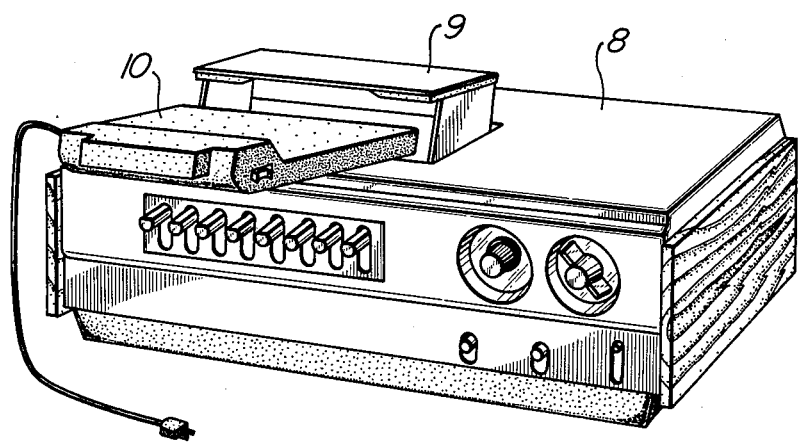
FIG. 3 is a perspective view of VTR on which the blower of FIG. 2 is mounted.

FIG. 2 shows an overall construction of a drying blower 10 in accordance with the present invention which is arranged to take in air from an air inlet ports 11 and discharge said air from an end portion 15a to function like as a so-called hair drier. 30 is a switch for turning on and off the operation of the blower 10, and 32 is a cord for connecting the blower 10 to an appropriate power supply source. When the blower 10 is used, it is, as shown in FIG. 3, inserted into a cassette holder 9 of a VTR 8 into which a tape cassette is to be inserted in operation. FIG. 3 shows a condition just before the blower 10 is inserted into the cassette holder 9.

Figure 4:
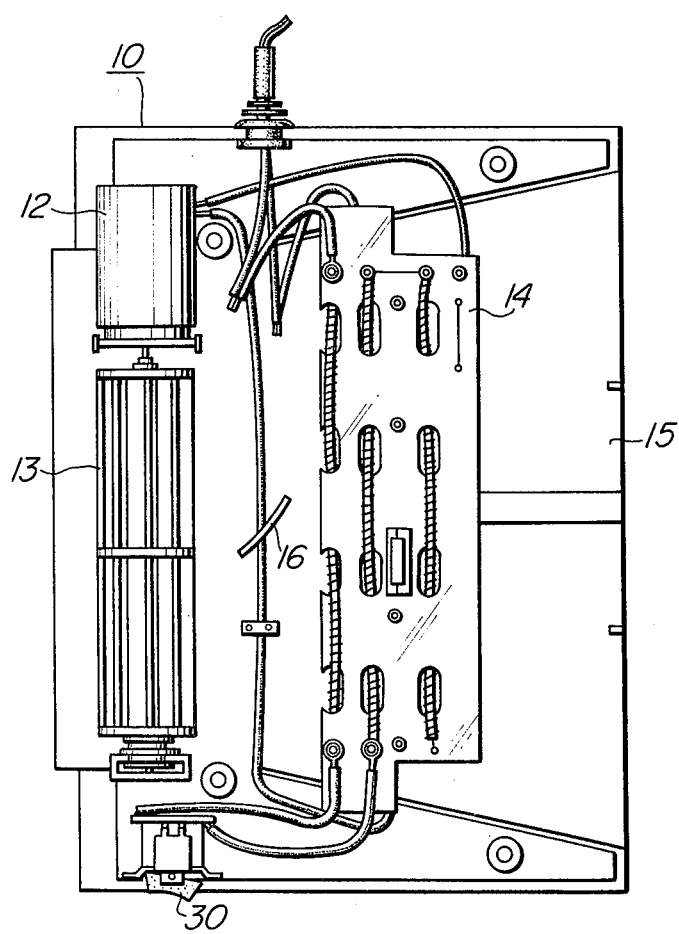
FIG. 4 shows an internal construction of the blower of FIG. 2.

FIG. 4 shows an internal construction of the blower 10 in which air is fed to a heater section 14 by rotor blades 13 driven by a motor 12 and the heated hot air is discharged from an air outlet port 15 formed in the end portion 15a. The outlet port 15 has a wide configuration as shown so that the air is directed to a relatively wider portion of the tape running section. Provided between the rotor blades 13 and the heater section 14 is a dividing plate 16 which varies the distribution of the air flow discharged from the outlet port for increasing the rate of air flow in a specific direction as, for example, to a portion on which a large amount of dew is produced. FIG. 5 is a sectional view of the blower 10 which is mounted on the cassette holder 9. The blower 10 takes in air from the air inlet ports 11 heats the air in the heater section 14 and discharges the heated air from the outlet port 15 to the tape running members, such as the cylinder 3, the impedance roller 5 and the audio control head 6 to evaporate the dew therefrom. It has been proved that the time of more than three hours required for evaporating dew in the conventional VTR can be reduced to about twenty minutes by using the blower 10.

A deflector 17 is provided in the blower 10 adjacent to the outlet port 15 to serve at its lower inclined portion to direct the air to said tape running members and enable the blower to be used with a VTR in which the cassette holder is not inclined.

The blower 10 includes a projected portion extending outwardly from the portion inserted into the cassette holder 9, and the projected portion is formed with an enlarged portion 10a to prevent the blower 10 being inserted too far into the holder to damage the parts of the mechanism. Moreover, the downward movement of the cassette holder 9 is limited by a lower surface 10b of the projected portion of the blower abutting against an upper panel 18 of the VTR 8 to prevent the holder from abutting against a reel table 19, for example. Furthermore, the provision of the rotor blades 13 in said projected portion makes it possible to increase the size of the blades thereby providing a larger amount of air to be blown. A portion 20 formed behind the rotor blades 13 of the blower 10 is to be engaged by fingers to facilitate the mounting and dismounting of the blower 10. For this purpose, furthermore, a knob may be provided. A filter 21 is provided below the air inlet ports 11 to prevent dust from being conveyed to the tape running portion thereby minimizing the risk of degrading the video head (not shown). The same effect will be brought forth by disposing such filter 21 near the outlet port 15.

We claim:

1. A blower for drying a tape running mechanism of a video tape recorder including a tape guide cylinder provided with a rotary head and a cassette holder for guiding a tape cassette between an open position and a playback or record position, the blower comprising:

an air conducting portion having a laterally widened outlet port at an end thereof for directing a flow of air to a tape running mechanism, said air conducting portion being adapted to be inserted into a cassette holder and having an outer configuration similar to a tape cassette normally insertable into the cassette holder;

air blowing means for taking in air from the exterior, for conveying the air through said air conducting portion, and for discharging the air from said outlet port;

means for heating the air introduced from the exterior into said air blowing means; and means provided on the blower for limiting a downward movement of the cassette holder from an open position to a playback or record position when the air conducting portion is inserted into the cassette holder.

2. A blower for drying a tape running mechanism of a video tape recorder including a tape guide cylinder provided with a rotary head and a cassette holder for guiding a tape cassette between an open position and a playback or record position, the blower comprising:

an air conducting portion having a laterally widened outlet port at an end thereof for directing a flow of air to a tape running mechanism, said air conducting portion being adapted to be inserted into a cassette holder and having an outer configuration similar to a tape cassette normally insertable into the cassette holder;

an enlarged portion thicker than said air conducting portion for preventing said air conducting portion from being inserted too far into the cassette holder, said enlarged portion projecting outwardly beyond an end of the cassette holder so as to prevent the cassette holder from being displaced from an open position to a record or playback position when the air conducting portion is inserted into the cassette holder;

a fan provided in said enlarged portion for taking in air from the exterior, for conveying the air through said air conducting portion, and for discharging the air from said outlet port; and means for heating the air introduced from the exterior.

3. A blower of claim 1 or 2 further comprising means provided adjacent to said outlet port for downwardly deflecting the flow of air discharged therefrom.

4. A blower of claim 1 or 2 further comprising a dividing plate means provided in said air conducting portion for varying the distribution of the air flow discharged from the outlet port, thereby increasing the rate of air flow in a specific direction.

5. A blower of claim 1 or 2 further comprising a filter provided in an air flow passage through which the air introduced from the exterior is conveyed to the outlet port.

* * * * *